United States Patent [19]

Houseman et al.

[11] Patent Number: 4,567,857
[45] Date of Patent: Feb. 4, 1986

[54] COMBUSTION ENGINE SYSTEM

[75] Inventors: John Houseman, Pasadena; Gerald E. Voecks, La Crescenta, both of Calif.

[73] Assignee: The United States of America as represented by the Administrator of the National Aeronautics and Space Administration, Washington, D.C.

[21] Appl. No.: 408,266

[22] Filed: Aug. 16, 1982

Related U.S. Application Data

[63] Continuation-in-part of Ser. No. 124,755, Feb. 26, 1980, abandoned.

[51] Int. Cl.[4] .......................... F02B 43/08; F02B 19/00
[52] U.S. Cl. ....................................... 123/3; 123/1 A; 123/DIG. 12; 123/557
[58] Field of Search ................... 123/3, DIG. 12, 1 A, 123/179 R, 557

[56] References Cited

U.S. PATENT DOCUMENTS

| 3,828,736 | 8/1974 | Koch | 123/3 |
| 4,130,200 | 10/1979 | Takeuchi et al. | 123/3 |
| 4,174,954 | 11/1979 | Kusebauch et al. | 123/3 |
| 4,244,188 | 1/1981 | Joy | 123/3 |
| 4,244,328 | 1/1981 | Lindstrom | 123/1 A |
| 4,407,238 | 10/1983 | Yoon | 123/3 |

FOREIGN PATENT DOCUMENTS

| 21325 | 2/1978 | Japan | 123/1 A |
| 12046 | 2/1981 | Japan | 123/1 A |

WO80/01398 7/1980 PCT Int'l Appl. ................ 123/1 A

Primary Examiner—Ethel R. Cross
Attorney, Agent, or Firm—Paul F. McCaul; John R. Manning; Thomas H. Jones

[57] ABSTRACT

A flow through catalytic reactor (10) which selectively catalytically decomposes methanol into a soot-free hydrogen-rich product gas utilizing engine exhaust at temperatures of 200° to 650° C. to provide the heat for vaporizing and decomposing the methanol. The reactor (10) is combined with either a spark ignited (28) or compression ignited (54) internal combustion engine or a gas turbine (202) to provide a combustion engine system. The system may be fueled entirely by the hydrogen-rich gas produced in the methanol decomposition reactor or the system may be operated on mixed fuels for transient power gain and for cold start of the engine system. The reactor (10) includes a decomposition zone formed by a plurality of elongated cylinders (12) which contain a body (114) of vapor-permeable, methanol decomposition catalyst preferably a shift catalyst such as copper-zinc. A vaporizer (14) is provided for vaporizing liquid methanol prior to introduction into the elongated cylinders (12). Exhaust gas from the internal combustion engine is passed in contact with the elongated cylinders (12) to supply the heat needed for methanol decomposition. The partially cooled exhaust gases are then passed to the vaporizer (14) where residual heat in the exhaust is utilized in vaporization of liquid methanol.

29 Claims, 13 Drawing Figures

COMBUSTION ENGINE SYSTEM

ORIGIN OF THE INVENTION

The invention described herein was made in the performance of work under a NASA contract and is subject to the provisions of Section 305 of the NASA Act of 1958, Public Law 85-568 (72 Stat. 435; 42 USC 2457).

CROSS-REFERENCE TO RELATED APPLICATION

This application is a continuation-in-part of copending application Ser. No. 124,775, filed 2-26-80, now abandoned.

BACKGROUND OF THE INVENTION

The search for a clean, efficient internal combustion engine system has focused considerable attention on the benefits of hydrogen as a fuel. The absence of carbon in this fuel virtually eliminates hydrocarbon and carbon monoxide emissions. The extremely low lean flammability limit of hydrogen allows lean combustion with low $NO_x$ production and increased engine efficiency. One of the disadvantages of hydrogen fueled engines is the reduction in maximum power as the gaseous fuel displaces some of the air during the intake stroke.

Hydrogen fueled engines have not come into use due to the difficulty of storing hydrogen onboard a vehicle; either as a compressed gas or as a cryogenic liquid. Storage of hydrogen as a hydride appears promising, but the technology is not sufficiently developed yet and the concept has an inherent high weight penalty associated with it.

An alternative to hydrogen storage is to generate the hydrogen onboard the vehicle on demand from a stored liquid fuel. The first choice for such storable liquid fuel is of course gasoline itself. A compact onboard hydrogen generator has been developed based on the partial oxidation of gasoline with air. (U.S. Pat. No. 4,003,133 issued to Houseman et al.) However, the hydrogen gas generated from partial oxidation of gasoline contains undesirable amounts of carbon monoxide, together with nitrogen diluent. Also, during the conversion of gasoline to hydrogen 22% of the energy content of the fuel is released as sensible heat which cannot be utilized. Also, the hydrogen generator operates at high temperatures (980°-1050° C.), which requires a long start-up time and special materials of construction.

Gasoline is also undesirable since it is subject to increasing fuel costs and to diminishing oil reserves. As a result, there is growing interest in the search for alternative fuels to reduce the dependency on expensive oil imports. Long before today's energy crisis, alcohol fuels were proposed as gasoline-blending compounds for use in internal combustion (IC) engines. Two alcohol compounds, ethanol and methanol, are still receiving continued attention. Racing cars, for example, use alcohol blends because of their increased power relative to gasoline.

Ethanol can be produced by fermentation from agricultural products such as grain, cane, molasses, potatoes, and mannite, a tropical plant. Methanol can be manufactured from a large variety of materials, including wood, seaweed, municipal wastes, residual oil, peat, and coal. Because of the abundant coal reserves in the United States, the future supply of methanol seems more promising than that of ethanol. Further, methanol can be produced relatively easily from coal gasification products with a high thermal efficiency and at a reasonable price. As such, methanol appears to be attractive from an energy self-sufficiency point of view for use as a storable liquid fuel for generating hydrogen.

The direct decomposition of 1 mole of methanol into 2 moles of hydrogen and 1 mole of carbon monoxide represents a convenient cycle for generating hydrogen-rich gas from liquid methanol:

$$CH_3OH_{(l)} \rightarrow 2H_{2(g)} + CO_{(g)}$$

Methanol contains a lower heating value of 19,910 kj/kg (8560 Btu/lb) while the corresponding hydrogen and carbon monoxide products from the reaction $CH_3OH \rightarrow 2H_2 + CO$ contain a combined lower heating value of 23,840 kj/kg (10,250 Btu/lb). The 20% increase in heat content of the dissociated methanol products is derived from the energy which is consumed in the cleavage of hydrogen-carbon and hydrogen-oxygen chemical bonds to produce hydrogen and carbon monoxide.

Figure 1:
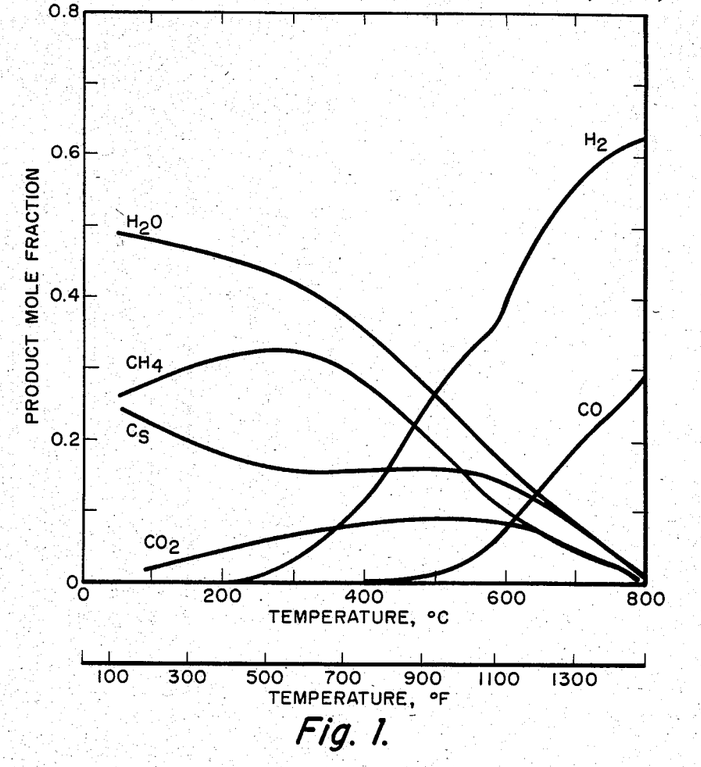
FIG. 1 is a thermodynamic equilibrium graph showing the equilibrium thermal decomposition products of methanol decomposition at different temperatures.

To facilitate this endothermic chemical reaction and further enhance the system energy gain, engine exhaust gas heat can be utilized which usually has a temperature range from 200° C. to 650° C. Thermodynamic equilibrium would predict carbon formation and very little hydrogen and carbon monoxide production in the normal engine exhaust temperature range. This is illustrated in FIG. 1. Carbon soot not only decreases the energy efficiency of the methanol decomposition, but also causes clogging of carburetor jets and float mechanisms. An example of such a carbon soot producing methanol reactor using exhaust gas as a source of heat is given by Dimitroff, E. and Vitkovits, J. A. of the Southwest Research Institute in a paper presented at the 1976 Spring Meeting of the Central States Section of the Combustion Institute.

A catalyst can be utilized to inhibit the formation of carbon and to facilitate the decomposition reaction at lower temperatures by controlling the mechanism by which the methanol molecule reacts. Furthermore, in an engine which would be combusting hydrogen/carbon monoxide, the engine would probably be operated at leaner equivalence ratios (1, 2) which could be as lean as $\phi = 0.5$. This would lower the engine exhaust gas temperatures even further demanding the activity of the catalyst to be high and over a wide temperature range as well as an effective exchange of heat from the exhaust gas into the methanol catalyst bed.

The catalyst must be capable of operation at temperatures up to 650° C. (1200° F.), under pressures to 1034 kPa. A minimum conversion of 80% may be considered acceptable under maximum flow conditions depending on the engine and duty. The catalyst must be able to withstand condensation of liquid methanol on the catalyst particles which may occur during cold start without spoiling or crumbling. High structural integrity during thermal cycling without carbon formation are also necessary catalyst properties. Selectivity of methanol decomposition (to hydrogen and carbon monoxide) over dehydration to dimethyl ether ($2CH_3OH \rightarrow CH_3OCH_3 + H_2O$) and limited activity for methanation due to product recombination ($3H_2 + CO \rightarrow CH_4 + H_2O$) under the various operating conditions are also important considerations.

SUMMARY OF THE INVENTION

A methanol decomposition reactor has been provided in accordance with this invention. The reactor can be efficiently and reliably operated at normal exhaust gas temperatures in the range of 200 to 650 degrees C. with no production of soot. This is accomplished in this invention by the operation of a catalytic reactor under conditions to produce a hydrogen-rich product gas while eliminating production of solid carbon at the normal temperature range of exhaust gases of internal combustion engines. The present invention also provides use of mixed fuels for transient power gain and for cold start of the engine.

The catalytic methanol dissociation reactor of this invention combines the elements of (1) a configuration compatible with the system into which it will be incorporated; (2) effective utilization of the exhaust gas heat by means of proper design to enhance heat transfer into the catalyst bed, and (3) a catalyst selection which will efficiently and selectively dissociate methanol under all operating conditions encountered while simultaneously maintaining activity and structural integrity.

The methanol reactor has a flow-through decomposition zone which contains a porous bed of solid, selective, decomposition catalyst and a means of heating this zone, preferably with the exhaust gases. The exhaust gases heat the decomposition zone to temperatures between 200° and 650° C. which results in the decomposition of methanol to produce a hydrogen-rich product gas. The liquid methanol can be vaporized and superheated in a vaporizer prior to introduction into the decomposition reactor. The vaporizer preferably receives the heat necessary for vaporization of the methanol by passing the exhaust gases after they leave the decomposition reactor into indirect thermal contact with the methanol. Engine cooling water may also be used to vaporize the methanol.

The catalytic methanol reactor may be used in combination with either a spark ignition combustion or compression ignition (Diesel) engine to form a combustion engine system.

The combustion engine system includes a vaporizer for vaporizing liquid methanol fuel which is fed to the vaporizer from a fuel reservoir. The heated vapors of methanol fuel are catalytically decomposed in the reactor and the product gas is transferred to a carburetor where it is mixed with an oxygen containing gas, such as air, to form a combustion gas. The combustion gas is fed into a combustion reactor where the combustion gas is ignited to produce power, heat and hot exhaust gas.

The hot exhaust gas produced in the combustion reactor provides means for heating the decomposition zone and is also used by the vaporizer in vaporizing the methanol fuel and heating the vapors. Since the decomposition of methanol is an endothermic reaction, the thermal energy required for this conversion is stored in the fuel as potential chemical energy in the form of hydrogen and carbon monoxide. Therefore, the thermal efficiency of the reactor-engine system is increased by the amount of thermal energy extracted from the exhaust gases for the vaporization and decomposition of methanol.

In the case of the compression-ignition (Diesel) engine, the gas is aspirated into the combustion air, and the air/gas mixture is uniformly mixed and the combustion conditions are well-defined relative to the normal conditions in which a jet of liquid fuel burns under non-homogeneous conditions in the combustion chamber. The well-mixed air/gas mixture will have a lower average temperature (but high enough to sustain methanol decomposition with exhaust gas) after combustion than Diesel fuel combustion and therefore produce less $NO_x$. The smoke from Diesel fuel combustion is also greatly reduced.

The use of a gaseous fuel reduces the maximum power output of an engine, as the gaseous fuel takes up some of the air volume during the intake stroke. This problem is partially remedied by cooling the gaseous fuel prior to introduction into the engine. Also, there are occasions where absolute maximum power from an engine is demanded, e.g. in passing. To provide this capability, some liquid methanol can be made to by-pass the hydrogen generator so that liquid methanol is fed directly to the engine. Liquid methanol burns quite well, and maximum power can be obtained this way. In the case of the Diesel engine, the methanol may be injected into the combustion chamber.

Other features and attendant advantages of the present invention will become apparent as the invention becomes better understood by reference to the following detailed description when considered in conjunction with the accompanying drawings.

DETAILED DESCRIPTION OF THE INVENTION

FIG. 1 is a graph which has been included as part of the detailed description to demonstrate a serious problem which the present invention solves. In viewing FIG. 1, it can be seen that at temperatures below 200° C. thermal decomposition of methanol can result in the production of water, methane, solid carbon and carbon dioxide. As the temperature is increased, methanol begins to thermally decompose into hydrogen and carbon monoxide. However, below 800° C. there can be significant amounts of water, methane, solid carbon and carbon dioxide in the methanol decomposition products. It is only above 800° C. that the equilibrium product gas of thermal methanol decomposition contains only hydrogen and carbon monoxide. As previously discussed, it is highly desirable to utilize methanol as a storable liquid fuel which is decomposed to produce a hydrogen-rich product gas for use in a hydrogen-fueled engine. However, as shown in FIG. 1, for simple thermal decomposition of methanol to be effective at thermodynamic equilibrium conditions, it must be carried out at over 800° C. Since normal internal combustion engine exhaust gases vary in temperature from 400° to 700° C., there is a severe problem presented in providing the amount of heat necessary to thermally decompose methanol into a soot-free hydrogen gas.

Figure 2:
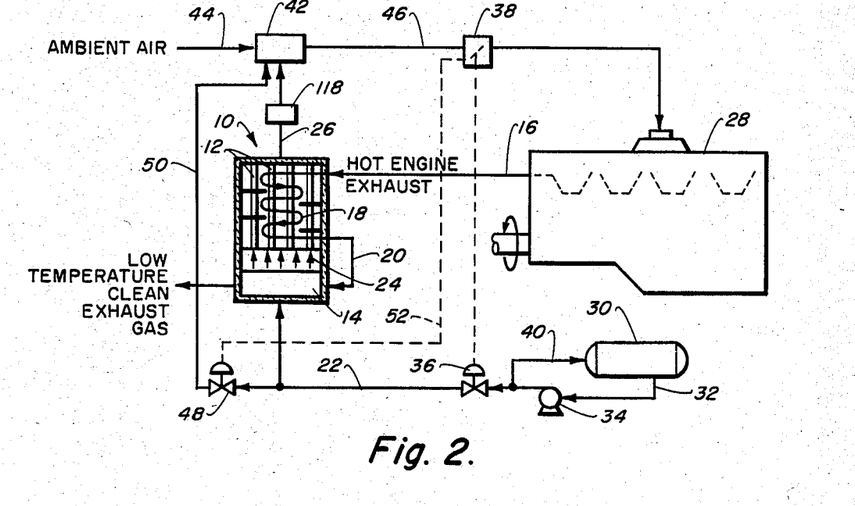
FIG. 2 is a diagrammatic representation of a preferred engine combustion system utilizing a spark ignited engine.

The present invention utilizes selective catalysts to produce a product gas containing only hydrogen and carbon monoxide at the lower exhaust gas temperatures of 200° to 650° C. The catalytic reactor of the present invention is shown in both FIGS. 2 and 3. In FIG. 2 the catalytic reactor is used in combination with a spark-ignited combustion engine and in FIG. 3 the catalytic reactor is used in combination with a compression ignition (Diesel) engine. The catalytic reactor in both FIGS. 2 and 3 are identical and the same numbers will be used for their identification.

Figure 3:
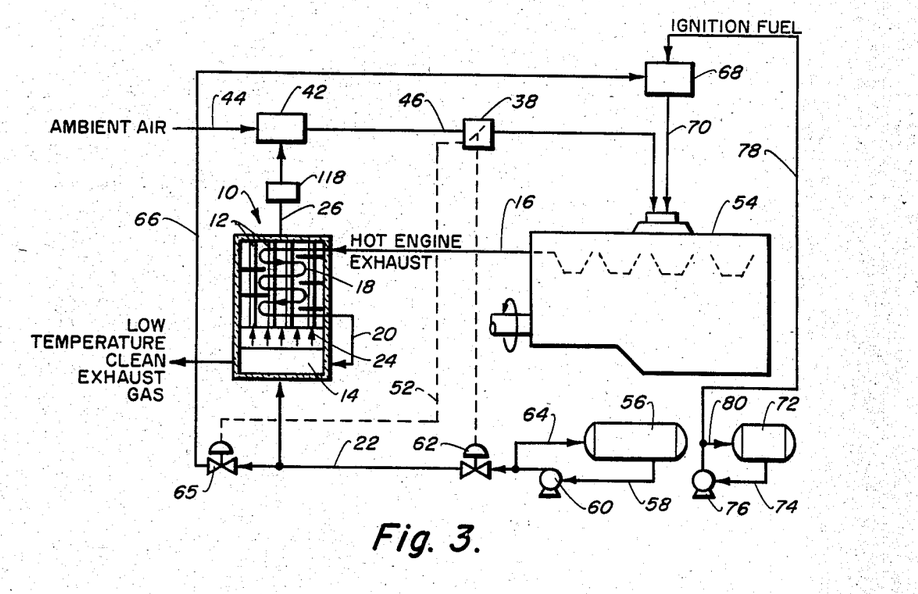
FIG. 3 is a diagrammatic representation of a preferred engine combustion system utilizing a compression ignited (Diesel) engine.

The catalytic reactor of the present invention is shown generally at 10 in FIGS. 2 and 3. The catalytic reactor 10 is divided into a flow-through decomposition zone defined by elongated tubes 12 and a vaporizer 14.

The elongated tubes 12 contain the vapor-permeable decomposition catalyst in various types and forms which will be described in detail later. The elongated tubes 12 are heated by hot engine exhaust gases introduced into the catalytic reactor via exhaust conduit 16. The hot engine exhaust gases flow past the outer surfaces of the bank of elongated tubes 12 as indicated by line 18. As the hot engine exhaust gases travel from the top of the elongated tubes 12 to the bottom as indicated by the arrows along line 18, heat transfer occurs and the exhaust gases become partially cooled. The exhaust gases are then passed via conduit 20 to the vaporizer 14 where residual heat remaining in the exhaust gas is used to vaporize liquid fuel entering the vaporizer 14. Although the present invention is not necessarily limited to methanol as a fuel, methanol fuel is preferred.

In operation, methanol is introduced into the vaporizer 14 via feedline 22. The vaporizer 14 vaporizes the methanol fuel to form a precursor gas which is introduced as indicated by arrows 24 into the elongated tubes 12. The precursor gas flows upwardly through the elongated tubes containing methanol decomposition catalyst where it is heated in contact with the catalyst and thereby decomposed to a soot-free hydrogen-rich fuel which is removed from the catalytic reactor by product removal conduit 26. The particular operating parameters within the catalytic reactor 10 such as temperature, precursor gas residence time, flow rate and methanol decomposition catalyst, may be varied to achieve the production of a soot-free hydrogen and carbon monoxide product gas.

The catalyst is disposed in the flow-through decomposition zone as a gas-permeable solid body. The solid body of catalyst also operates as a heat sink for the thermal energy absorbed by conduction from the exhaust gases. The decomposition zone is isolated from the flow of exhaust gases by a wall of high heat conductivity material such as a metal wall. The decomposition zone is preferably enclosed by an elongated cylinder of metal. The hot exhaust gases can be flowed concurrently or countercurrently past the wall of the zone. Countercurrent axial flow is preferred so that the hotter gases are first utilized to decompose methanol and the cooler gases still retain sufficient thermal value to vaporize and superheat the methanol liquid.

The body of catalyst can be particulate, or a monolithic, integral porous mass. Though a bed of particulate catalyst can be utilized, the particles tend to self-abrade from the vibrational forces experienced in an internal combustion engine vehicle and form fines which clog the bed. Furthermore, any fines that are carried over into the engine can seriously damage the latter so precautions would have to be implemented such as a filter to prohibit this. In addition, catalyst particles are only in point contact providing very poor heat transfer characteristics.

Therefore, it is preferred that the catalyst be fabricated in monolithic form. The preferred form of reactor is a series of elongated axial tubes containing an insert of permeable monolithic form. The preferred form of reactor is a series of elongated axial tubes containing an insert of permeable monolithic catalyst. The outside surface of the tubes provides a large surface area for heat transfer and the monolithic element provides excellent heat absorption and a large surface area for catalytic decomposition. The monolithic catalyst insert can be in the form of an irregular mesh or sponge-like body or a solid, cylindrical insert element containing a plurality of elongated, continuous, parallel passages. The insert can be formed of high heat conductivity ceramic or metal containing a coating of catalyst on the surface of the passages. The catalyst may be bound via a higher surface area material, a so called washcoat, according to methods commonly used in catalyst preparation and well-known to those well-versed in the state-of-the-art.

Another option for catalyst retention with the tubes 12 is to bind the catalyst to the inside tube wall. This provides efficient heat transfer to the catalyst. Catalysts fixed in this manner are commonly used in industry.

The preferred catalysts for efficiently and selectively decomposing methanol to hydrogen and carbon monoxide are methanol-reforming catalysts such as copper-zinc, copper-chromium or zinc-chromium or noble metals such as platinum or palladium. The binary catalysts such as copper-zinc can be present as separate components, an alloy and can contain other ingredients such as rare earth promoters. The noble metal catalysts can also contain promoters to permit reaction at lower temperatures while avoiding soot formation at higher temperatures. The catalysts can be provided in pure form or can be coated on the surface of a solid support such as alumina pellets in an amount from 0.1 to 20% by weight of the pellets, usually from 0.5 to 5%. The catalysts can be coated onto the surface of the passages through the monolithic elements and may be bound through the use of a slipcoat material such as is commonly used in vehicular auto exhaust gas clean-up catalysts.

Figure 4:
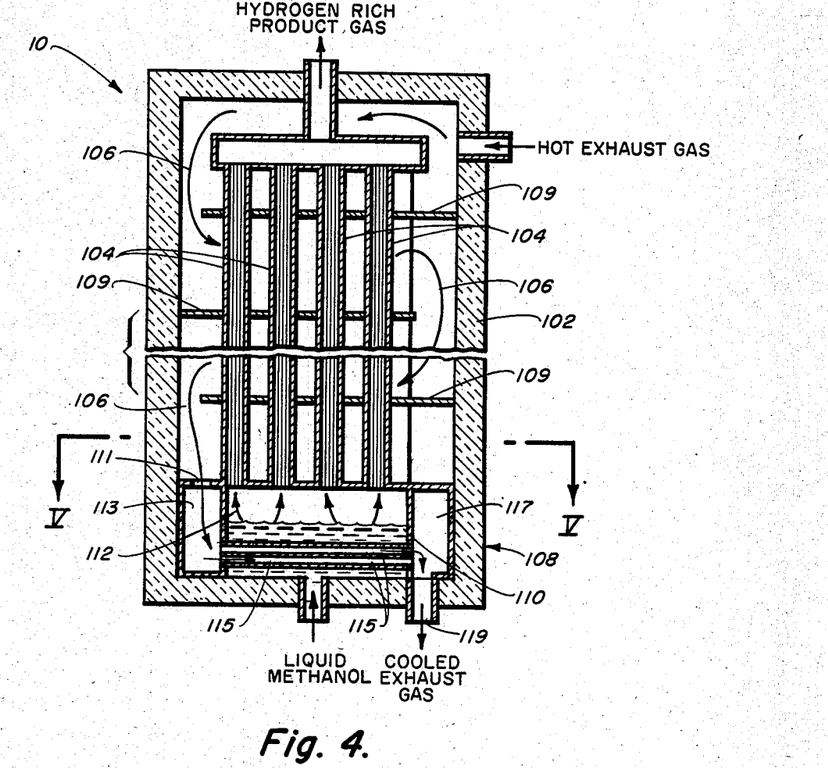
FIG. 4 is a more detailed schematic drawing of a preferred catalytic reactor of the present invention.
Figure 5:
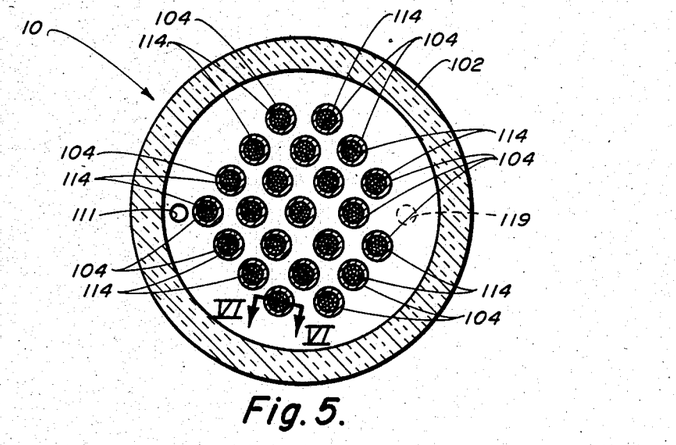
FIG. 5 is a cross-sectional view of FIG. 4 taken in the V—V plane.
Figure 6:
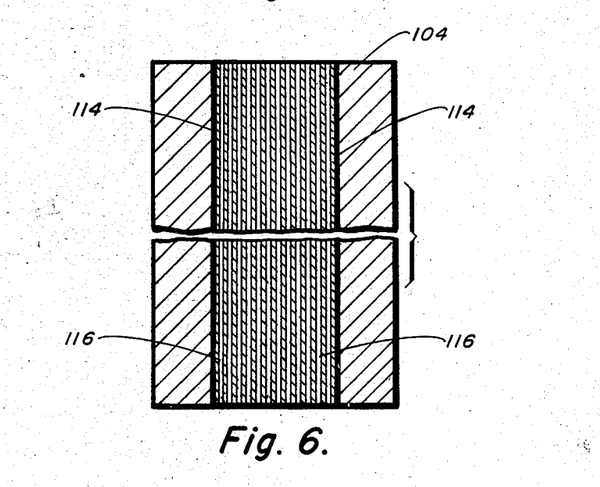
FIG. 6 is a detailed cross-sectional view of FIG. 5 taken in the VI—VI plane.

Referring now to FIGS. 4, 5 and 6, FIG. 4 is a more detailed schematic representation of the catalytic reactor 10 shown in FIGS. 2 and 3. The reactor 10 has insulated walls 102 to minimize radiant heat loss. Hot exhaust gas from an internal combustion engine is introduced into the reactor 10 as shown. The heat from the hot gas is transferred to elongated metal cylinders 104 which in turn transfer the heat to the catalyst and methanol gas therein. Baffles 109 are provided for circulating the exhaust gases evenly around the metal cylinders 104. The partially cooled exhaust gases are passed (as shown by curving arrows 106) around the metal cylinders and into vaporizer 108 through port 111 into header 113 and passed through heat exchange tubes 115 and collected in outlet header 117 and are exhausted through outlet 119. The remaining heat in the partially cooled exhaust gases is absorbed by the vaporizer 108 to vaporize the methanol liquid 110 into methanol vapor, as shown by arrows 112, which flow into the catalyst containing metal cylinders 104. If sufficient heat is present in the partially cooled exhaust gas, the methanol may also be superheated above vaporization temperatures in the vaporizer 108.

FIG. 5 is a cross section of the reactor showing an end view of the metal cylinders 104. The preferred monolithic catalyst insert is shown at 114. FIG. 6 is a detailed elongated sectional view of the preferred monolithic catalyst insert showing the plurality of elongated continuous parallel passageways 116.

Operation of the hydrogen generator with as short a residence time as possible with the highest practical space velocity will favor soot-free hydrogen/carbon monoxide formation at the 200° to 650° C. temperature of typical exhaust gases.

Referring to FIG. 2, the catalytic reactor 10 is shown in combination with a spark-ignited internal combustion engine 28. Liquid methanol for use in the combustion system is stored in reservoir 30. The liquid methanol is fed through line 32 to fuel pump 34 which supplies the necessary pressure for pumping the liquid fuel into the vaporizer 14. Fuel valve 36 is provided for controlling the flow of liquid methanol to vaporizer 14. The fuel valve 36 is operated between open and idle positions by throttle 38. As the throttle 38 is moved from the idle to full power position, valve 36 is correspondingly moved from a relatively closed (idle) position to a position allowing increased flow of methanol liquid. Provision is made via line 40 to recycle excess methanol liquid back to the methanol reservoir 30.

As previously described, the liquid methanol is passed via feed line 22 into the catalytic reactor 10 where the methanol is thermo-catalytically decomposed to hydrogen and carbon monoxide to form a product gas which is removed via line 26. The product gas in line 26 is introduced into carburetor 42. The carburetor 42 mixes the product gas from line 26 with air introduced through line 44 to produce a combustion gas. The combustion gas is then transferred to the internal combustion engine 28 via carburetor line 46. The control of combustion gas flow to the internal combustion engine 28 is also controlled by throttle 38. The combustion gas, upon entering the internal combustion engine 28 is spark-ignited to produce power, hot engine exhaust and a certain amount of waste heat. Approximately a third of the energy generated during the combustion of the combustion gas is present in the hot engine exhaust. The hot engine exhaust is cycled via line 16 to the reactor 10 for heating the elongated tubes 12 and the vaporizer 14.

One of the few disadvantages of a gaseous fuel relative to a liquid fuel is that for a given equivalence ratio (actual fuel-to-air ratio divided by stoichiometric fuel-to-air ratio), maximum engine power is reduced, since the gaseous fuel displaces some of the air during the intake stroke. Since there are occasions when absolute maximum power is demanded, it is desirable to provide a bypass capability where liquid fuel may be fed to the carburetor rather than or in addition to the gaseous product fuel. To provide for this capability, valve 48 is provided which when open allows methanol to be fed directly through line 50 into line 26 and subsequently carburetor 42. The bypass valve 48 is actuated by the throttle when full throttle is applied as shown by dotted line 52. The above-described technique can also be used to start the engine from rest when the catalytic reactor 10 has not yet reached operating temperatures for methanol decomposition.

Another method for starting the engine not involving the use of liquid methanol involves a steady state accumulator (not shown). The steady state accumulator may be used to accumulate decomposed product gases during steady state operation of the vehicle when the decomposed gases generated are in excess of engine demand. These surplus gases may be accumulated and stored in the steady state accumulator and later used during engine start-up, thus eliminating any cold-starting problems which may be associated with the use of straight liquid methanol. Clearly, the use of a steady state accumulator would require considerable control equipment and also occupies sizable space; hence, its use may not be practical where space limitations must be considered.

For a given system, the amount of methanol that can be decomposed depends on the temperature and amount of the exhaust gases. This, in turn, depends on the required power level and the equivalence ratio that is used. For an equivalence ratio of unity, the exhaust gas must be cooled by 480° C. in order to provide the required heat for complete decomposition of the methanol. At lower equivalence ratios, the temperature drop required is less. Exhaust temperatures upstream of the hydrogen generator range from 260° to 650° C., depending upon the equivalence ratio. A simple energy balance shows that this range of exhaust temperatures is high enough for complete methanol decomposition. After the decomposition cycle has started, the upstream exhaust temperatures will be maintained for a given equivalence ratio to be adequate for catalytic decomposition of the methanol.

FIG. 3 shows the catalytic reactor 10 in combination with a compression-ignited (Diesel) internal combustion engine 54. Operation of the Diesel combustion system is very similar to the operation of a spark-ignited combustion system except for minor differences regarding injection of liquid methanol and Diesel fuel into the Diesel engine 54. As was the case for the spark-ignited combustion engine system, the Diesel combustion system includes a liquid methanol reservoir 56 having a feed line 58 for transferring the liquid methanol to a fuel pump 60. Throttle-actuated fuel valve 62 is also provided for controlling the amount of methanol transferred through line 22 into the catalytic reactor 10. Liquid recycle line 64 is provided for returning methanol fuel to the methanol reservoir 56 as excess fuel is being pumped by fuel pump 60. Bypass valve 65 is provided for allowing methanol fuel to bypass the catalytic reactor during maximum power output. The methanol fuel flows from bypass valve 65 through line 66 to injector 68. The injector injects the methanol fuel into the Diesel engine 54 via line 70. As can be seen in the Diesel combustion system, the methanol liquid fuel which bypasses the catalytic reactor 10 is not mixed with air in the carburetor 42 but is injected directly into the Diesel engine 54 as is common in Diesel engine operation.

It should be noted that in conventional Diesel engines, ignition is initiated by the heat of compression. However, unlike Diesel fuel, hydrogen-rich product gases do not ignite very well by compression heat alone. This requires a small pilot jet of liquid fuel to be injected into the Diesel engine 54 to initiate the ignition. Once the flame has started, it will propagate throughout the combustible gas mixture. Although methanol may be used as the pilot charge, some problems have been experienced with its use as such. Therefore, provision has been made for injecting a small pilot charge (about equal to the idling charge of the engine) of Diesel fuel into the Diesel engine 54. Specifically, Diesel fuel reservoir 72 is provided for supplying Diesel fuel through line 74 to Diesel fuel pump 76. The Diesel fuel pump pumps the Diesel fuel under pressure through line 78 to injector 68 which injects the desired pilot charge of Diesel fuel through line 70 into the Diesel engine 54. Recycle line 80 is provided for recycling Diesel fuel back to the reservoir 72 as excess amounts of Diesel fuel are being pumped by pump 76. The same system can be utilized to start and idle the engine.

The high temperatures of decomposed methanol can reduce charge density at the engine inlet and, hence, power. Fortunately, these losses can be controlled to some extent by employing a forecooler, as shown 118 in FIGS. 2 and 3.

Product gases leave the hydrogen generator at 250° C. If these gases are not cooled in a forecooler, the engine inlet charge temperatures will be high because of the high specific heat of hydrogen. In the absence of forecooler 118, average temperatures of the decomposed methanol-air mixture will be over 50° C. This high temperature reduces the inlet charge density and, hence, engine power. These losses are reduced by cooling the decomposed gases in forecooler 118.

Although the power losses resulting from high charge temperatures of decomposed methanol can be reduced by employing forecooler 118, it is not possible to prevent volumetric power losses. Decomposed methanol reduces maximum engine power, since the gaseous fuel displaces some air during the intake stroke. However, increased heating value of decomposed methanol and increased engine efficiency at low equivalence ratios largely compensate for the losses in power resulting from using a gaseous fuel.

Figure 7:
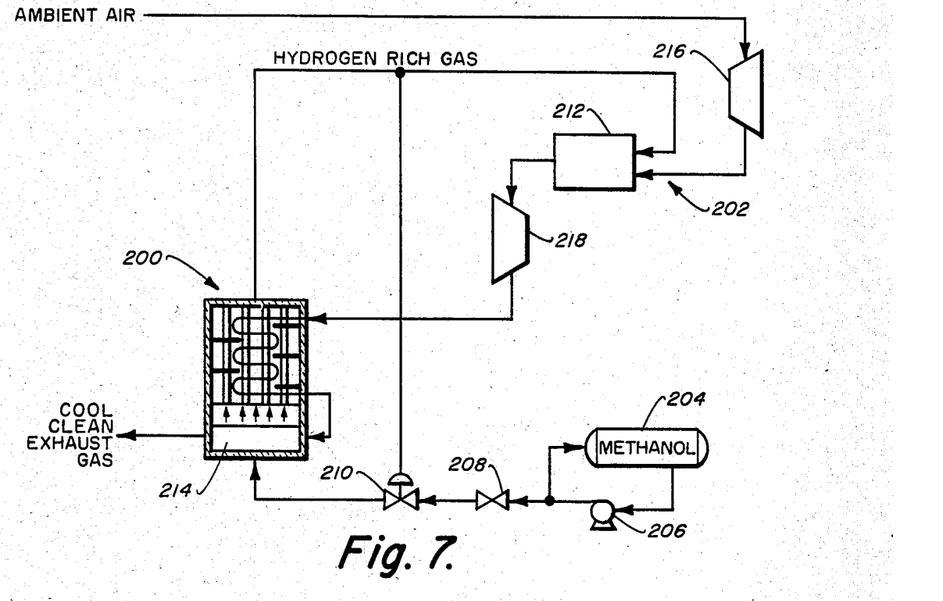
FIG. 7 is a schematic view of a methanol decomposition bottoming cycle in combination with a gas turbine.

FIG. 7 shows the catalytic reactor 200 in combination with a gas turbine 202. Gas turbines are routinely run on natural gas, which in this case is replaced by the hydrogen-rich gas product from the catalytic reactor. The catalytic reactor in this case is operated at elevated pressure (say 150 psig), as the combustor is operated at close to this pressure level.

As in the previous system, a methanol tank 204 delivers the methanol by means of a fuel pump 206 to the catalytic reactor 200 (or hydrogen generator), this time at elevated pressure in excess of 150 psig. A bypass valve 210 allows injection of liquid methanol directly into the gas turbine combustor 212 for start up.

Once the hot turbine exhaust gases have heated up the catalytic reactor 200, the bypass valve 210 directs the liquid methanol towards the methanol vaporizer section 214 in the bottom of the reactor (not shown) and the vaporized methanol passes through the tubes containing the catalyst, thus affecting decomposition. The hot turbine exhaust gases provide the required heat by heat transfer through the tube walls.

The resulting hydrogen-rich gas is then burned in the combustor 200 with compressed air from air compressor 216. The hot combustion gases from the combustor 202 then pass through the expander 218, thus producing mechanical work, and then pass through the catalytic reactor 200 and the methanol vaporizer 214.

Additional advantages in this type of combustion system versus a direct liquid methanol system are lower possible equivalence ratios in the combustor, as a result of the high flame speed of hydrogen, accompanied by lower combustion temperatures, producing lower $NO_x$ and requiring less combustor maintenance.

Experimental

Figure 8:
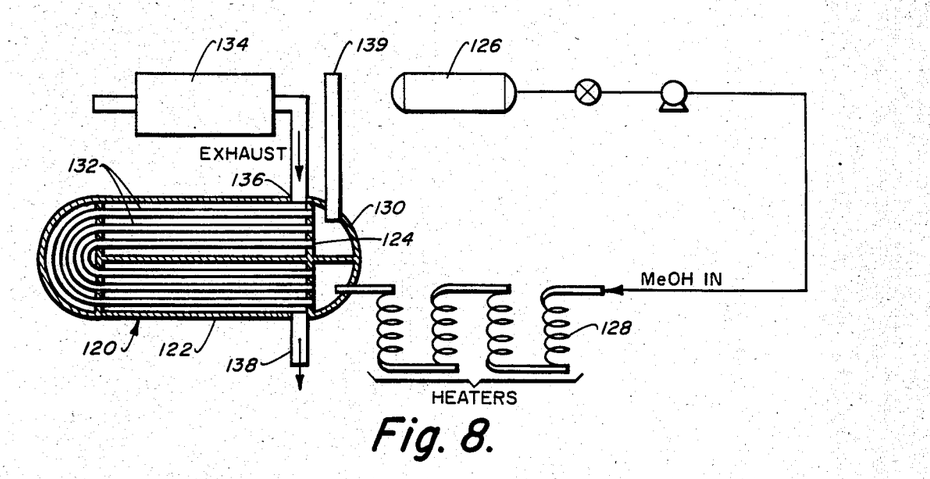
FIG. 8 is a schematic view of an experimental methanol decomposition reactor.

A stainless steel reactor 120 having a basic shell 122 and tube 124 design was constructed in FIG. 8. Liquid methanol from storage tank 126 was vaporized in coil heater 128 and the vapors fed to the inlet head 130 of the tubes 124. The tubes contained a porous body 132 of particulate decomposition catalyst. Reformed gas was recovered through outlet 139. Exhaust gas generated in furnace 134 flowed into the shell 122 through inlet 136 past the tubes 124 and was removed through outlet 138.

A reactor was constructed with seventy-U-tubes of 0.953 cm (0.375 in.) O.D. stainless steel tubing. The stainless shell diameter was 18.7 cm (7.38 in.), with a wall thickness of 0.159 cm (0.0625 in.) and the overall length of the shell-and-tube section was 94.7 cm (37.3 in.). Seven pairs of baffles (not shown) were located evenly spaced along the tubes for directing the two-pass exhaust gas flow across the tubes. The bell, or head, was bolted directly onto the shell flange and retained a gasketed screen which sealed the unit as well as held the catalyst in place in the tubes. The head was designed to provide either a two-pass or four-pass configuration for tube flow. Taps in the bottom half of the head were used to monitor mid-point product and temperature during four-pass operation. Product gas was sampled from the line leaving the port on the product quadrant. Thermocouples were located in the catalyst bed at the tube ends, at the inlet and exhaust ports of both engine exhaust and methanol feedstream, in contact with tube walls in two locations on each exhaust pass and in the mid-point exhaust gas stream. The total unit, with catalyst, weighed 56.7 kg (125 lbs).

Gas analysis was accomplished by passing some of the product or mid-point gas stream through a series of on line analyzers and a gas chromatograph.

A stainless steel column packed with Poropak Q was used for hydrocarbon separation on the gas chromatograph.

Methanol was fed under pressure through a rotometer to a series of heated copper tubing coils. No dissociation was found to take place when methanol was heated to the maximum inlet temperature of 316° C. (600° F.) in this heater system.

Heated exhaust gas to the reactor was supplied by a separate V-8 engine. Gaseous flow was monitored by a Meriam laminar air flow meter. The exhaust gas flowed through an electric tube furnace just prior to reactor entry which enabled fine tune control on the temperature of the exhaust gas entering the reactor.

Data

All data points were taken after the system had reached steady state operation at a set condition. Stability was maintained for 10 to 15 minutes before temperatures and gas compositions were measured.

Initial operating conditions focused on one catalyst, 1% platinum on alumina, and was directed toward establishing which parameters had the greatest effect on methanol conversion.

A series of tests were carried out to determine the effect on conversion of (1) methanol flow rate, and (2) exhaust gas inlet temperature. These initial tests used the four pass configuration to enable monitoring the mid-point conditions. Methanol flow in this operating mode was co-flow to the exhaust in the first two passes followed by counter-flow after the mid-point in last two passes.

Figure 9:
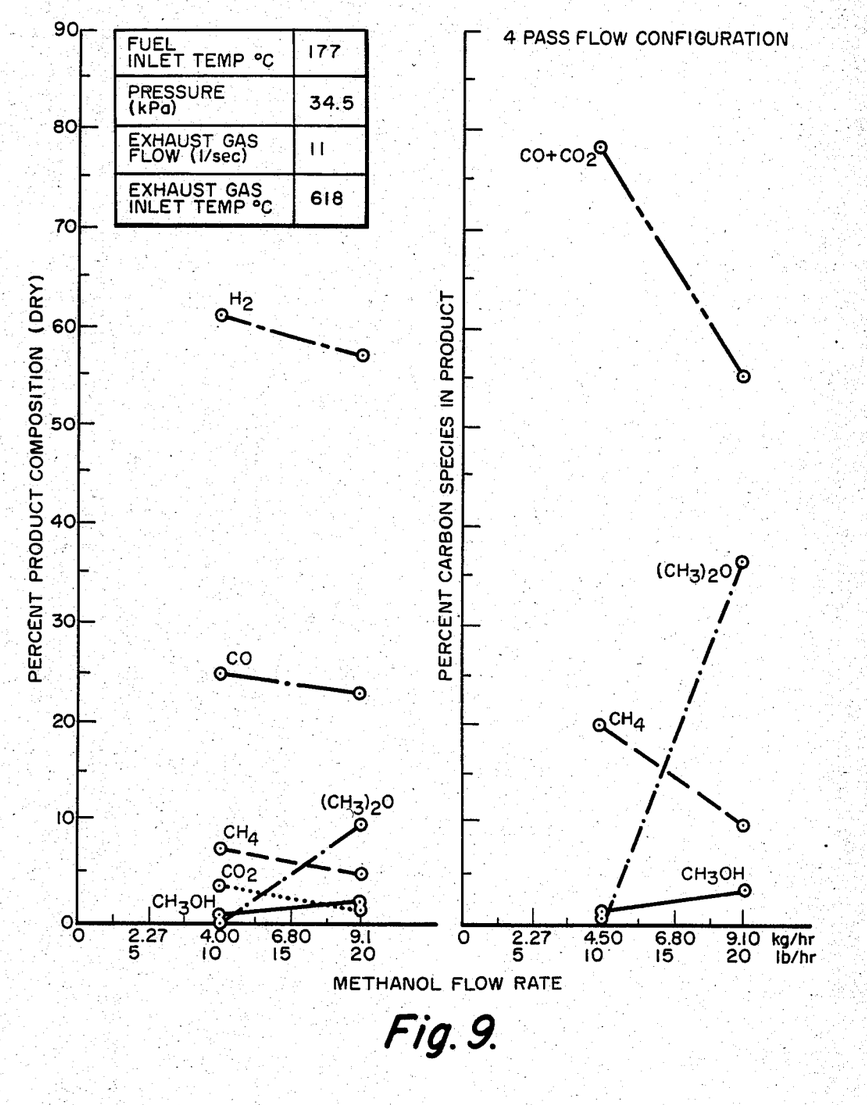
FIG. 9 is a set of graphs showing effect of methanol flow rate on conversion.
Figure 10:
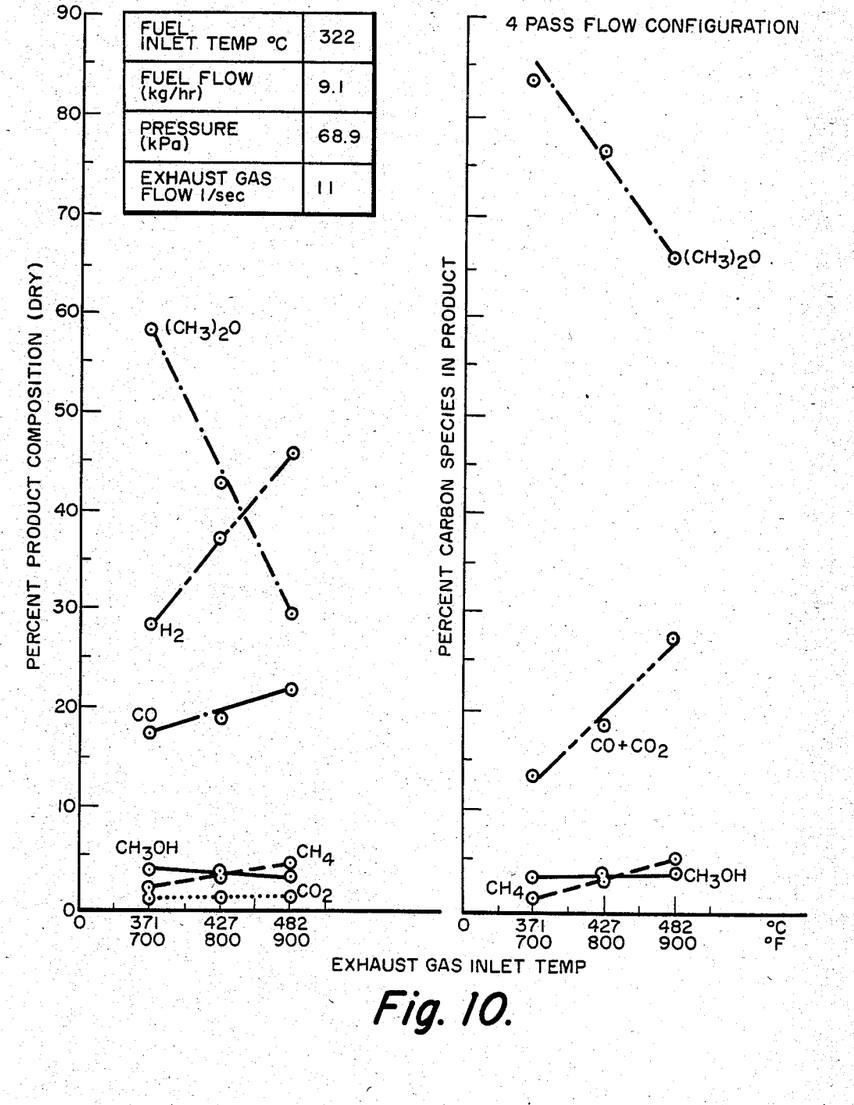
FIG. 10 is also a set of graphs showing effect of exhaust gas inlet temperature on conversion.

Plots which indicate effects of the flow rates and temperatures are presented in FIGS. 9-10. Both complete product composition and methanol conversion percentages are plotted. Because carbon dioxide is formed from the carbon monoxide-water gas shift reaction, both oxides are plotted on the methanol conversion plots. As shown in FIG. 9, at high exhaust gas temperatures hydrogen and carbon monoxide concentrations of 60 and 25% were obtained, which compares reasonably well with the 67 and 33% for the theoretical yield compositions.

Dimethyl ether ($CH_3)_2O$) is a byproduct that increased with methanol flow rate. However, all byproducts are volatile and easily combusted. FIG. 10 shows that at exhaust gas temperatures of 482° C. to 371° C. the dimethyl ether content can be as high as the hydrogen concentration.

A subsequent set of tests was conducted in which both of the two-pass methanol flow configurations were used. Flows and temperatures were chosen to approximate operating conditions which could be encountered in vehiclar operation. Data comparing similar run conditions in co-flow and counter-flow configurations are presented in Table I. The counter-flow configuration produced the best results.

An additional set of tests in the four-pass configuration was carried out to compare the activity of a copper/zinc/alumina catalyst to the platinum/alumina catalyst. These results are given in Table II. The first line represents the results with the Pt on alumina catalyst, while the second line shows the composition halfway through the reactor, where the reaction is not yet complete. The first half of the reactor tubes was then filled with Cu/Zn alumina catalyst, while the second half was again filled with Pt on alumina catalyst. Improved performance resulted, both at the exit (line 3) as well as at the midpoint (line 4). The reduction in byproducts formation like dimethyl ether and methane are noticeable.

TABLE I

Methanol Flow of 9.1 kg/hr (20 lbs/hr) Through Reactor With Catalyst

| Configuration | Methanol Inlet Temp °C. | (°F.) | Exhaust Gas Flow l/sec | (SCFM) | Exhaust Gas Inlet Temp °C. | (°F.) | Dry Volume Percent, Product | | | | | |
|---|---|---|---|---|---|---|---|---|---|---|---|---|
| | | | | | | | $H_2$ | CO | $CO_2$ | $CH_4$ | $(CH_3)_2O$ | $H_3COH$ |
| 2-Pass Counter Flow | | | | | | | | | | | | |
| 1 | 316 | (600) | 23 | (48) | 468 | (875) | 55.1 | 24.8 | 1.07 | 3.29 | 9.54 | 3.58 |
| 2 | 149 | (300) | 20 | (42) | 482 | (900) | 54.6 | 24.7 | 1.13 | 3.33 | 8.15 | 4.73 |
| 2-Pass Co Flow | | | | | | | | | | | | |
| 1 | 316 | (600) | 23 | (48) | 483 | (902) | 54.9 | 26.7 | 1.87 | 2.93 | 8.73 | 4.05 |
| 2 | 153 | (308) | 19 | (41) | 474 | (886) | 50.0 | 26.8 | 1.97 | 2.52 | 15.4 | 4.14 |

TABLE II

Products Derived From Methanol Flow of 9.1 kg/hr (20 lbs/hr) Through 4 Pass Reactor

| | | | | | | | | | | | | |
|---|---|---|---|---|---|---|---|---|---|---|---|---|
| Pt Cat | 320 | (608) | 23 | (48) | 486 | (906) | 54.9 | 23.8 | 1.15 | 4.40 | 13.0 | 2.94 |
| (Midpoint sample) | 320 | (608) | 23 | (48) | 486 | (906) | 41.7 | 19.7 | 1.34 | 4.59 | 30.2 | 3.47 |
| 1st 2 pass Cu/Zn Cat, 2nd 2 pass Pt Cat | 321 | (609) | 23 | (48) | 481 | (897) | 59.2 | 23.9 | 6.54 | 1.68 | 5.24 | 5.44 |
| (Midpoint sample) | 321 | (609) | 23 | (48) | 481 | (897) | 57.9 | 20.5 | 8.16 | 0.15 | 8.94 | 5.60 |

[Reactor Pressure in all Tables = 68.9 kPa (10 psig)]

The two-pass exhaust design provided reasonably high velocity to produce a good heat transfer coefficient on the shell side. Although the flow rate through the tube is almost an order of magnitude smaller than on the shell side, the presence of the catalyst pellets within the tubes produces a high velocity. To insure the maximum in-tube velocity and maximum tube-side heat transfer coefficient, a four-pass configuration was selected initially.

In methanol two-pass counter-flow operation, the maximum temperature difference between the methanol and the exhaust gas is available to maximize the heat transfer rate. On the other hand, if chemical kinetics control the overall rates, then co-flow would bring the methanol to its maximum temperature sooner and would therefore maximize the chemical rate. A number of mixed options are available in the two-pass shell, and two or four-pass tube configuration. In the initial tests the four-pass tube configuration was used. The importance of flow rates and temperatures was explored first.

The copper/zinc low temperature shift-type catalysts are more selective toward enhancing the methanol decomposition with less activity for methane formation. The effect of higher temperatures at the methanol inlet appears to favor methanol decomposition over dehydration to dimethyl ether which thereby reduces the need for high temperatures at the exit to decompose (steam reform) dimethyl ether. However, at leaner (and more efficient) engine operation, the exhaust temperature is reduced. Selective catalyst activity which enhances hydrogen and carbon monoxide production may be provided by a composite catalyst bed, i.e. more than one catalyst, positioned in a reactor to match catalyst activity with reactor heat transfer and engine exhaust gas temperature, as shown in Table II.

Figure 11:
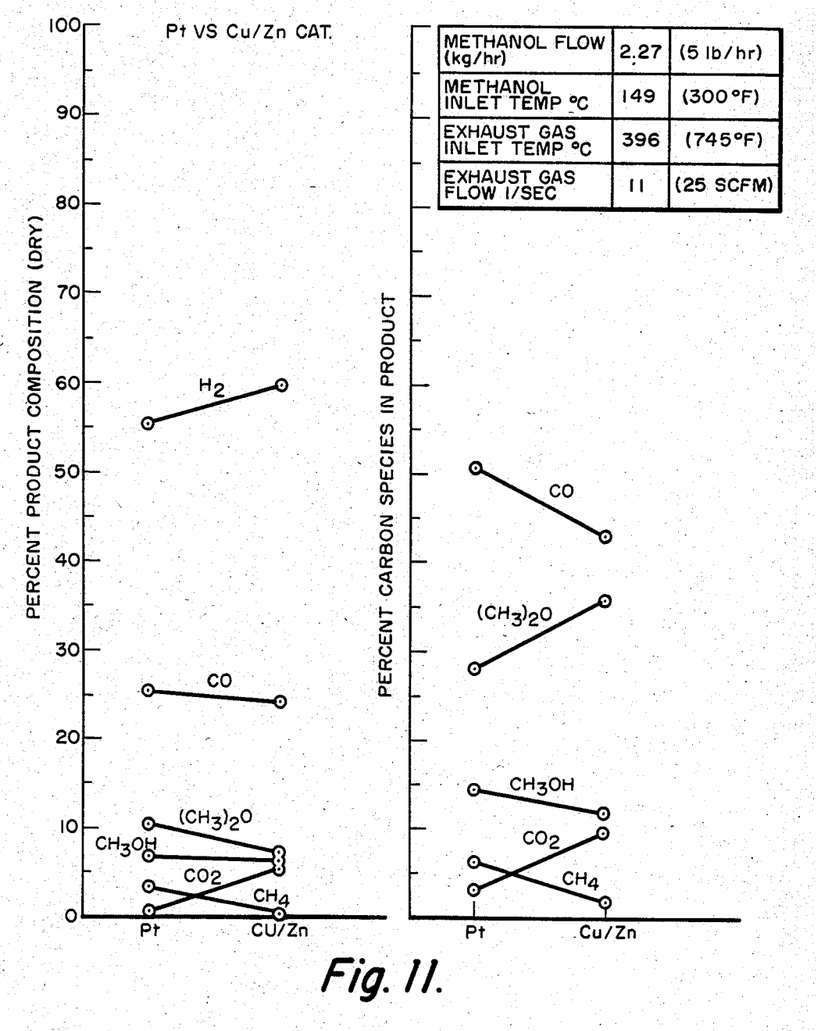
FIG. 11 is a set of graphs showing comparison of Pt and Cu/Zn catalysts at 5 lb/hour methanol flow.
Figure 12:
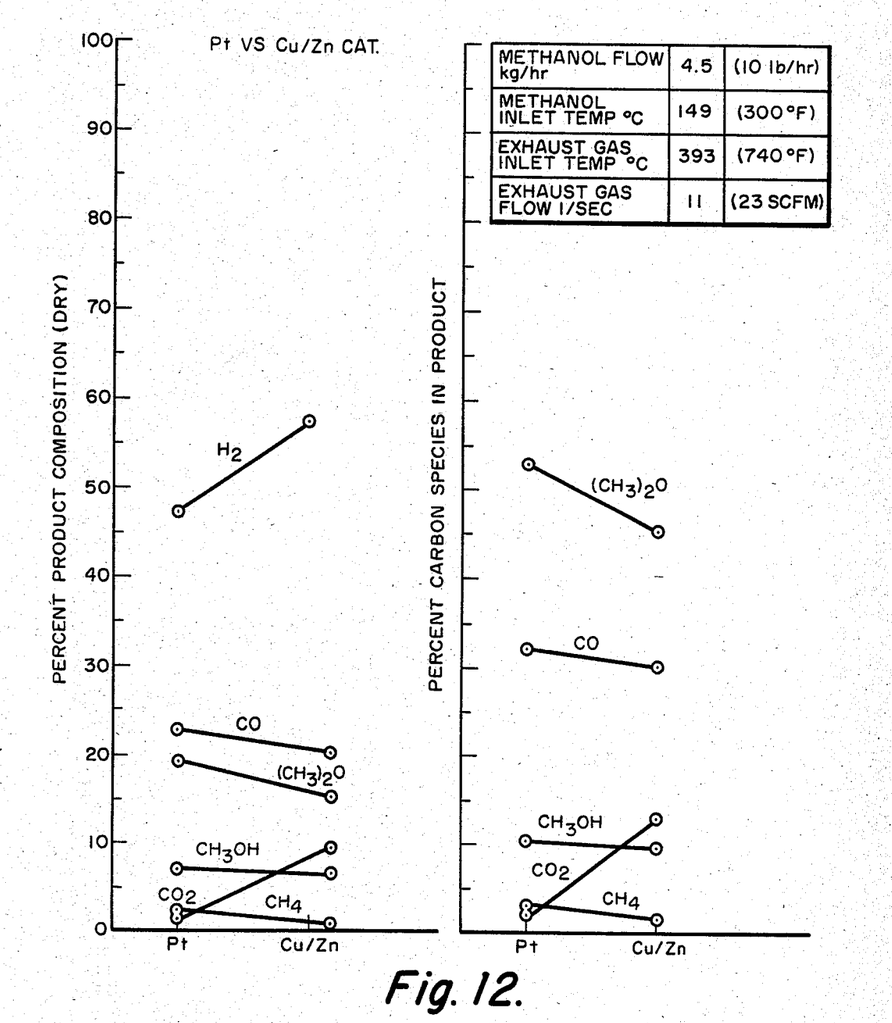
FIG. 12 is a set of graphs showing comparison of the same catalysts at 10 lb/hour.
Figure 13:
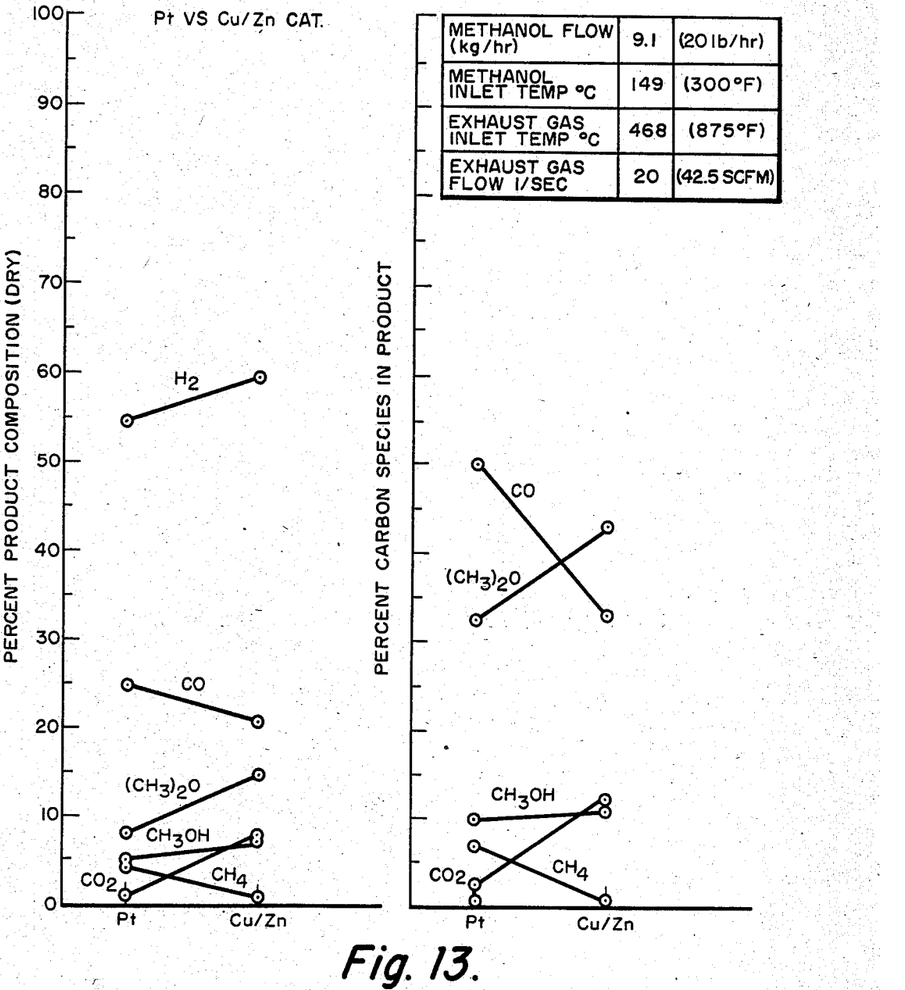
FIG. 13 is a set of graphs showing comparison of these catalysts at 20 lb/hour.

A comparison was made between an all platinum versus an all Cu/Zn catalyst. FIGS. 11, 12, and 13 show the results for the two different catalysts under identical conditions. FIGS. 11 and 12 show an improved hydrogen yield for the Cu/Zn catalyst at a methanol rate of 5 and 10 lbs/hour. At 20 lbs/hour of methanol (FIG. 13), a better hydrogen percentage was also obtained with Cu/Zn but the amount of byproduct dimethyl ether increased. However, methane production ($CH_4$) went down with Cu/Zn catalyst.

Overall it appears that Cu/Zn is a better catalyst for this purpose, but as the flow rate is increased, dimethyl ether is produced. The production of dimethyl ether is thermally about neutral, so no heat is absorbed from the exhaust gas. This is undesirable but otherwise does not present any problems as dimethyl ether is a volatile compound that is easily combusted.

It should be noted that the Cu/Zn catalyst used here contained alumina. The alumina acts as a binder and maintains the mechanical integrity of the Cu/Zn catalyst. Experiments with Cu/Zn catalyst that did not contain alumina showed considerable deterioration of the mechanical strength of the pellets, resulting in crumbling and fines production.

The present invention provides a combustion engine system which operates on clean hydrogen-rich gas, retaining most of the advantages of the hydrogen engine, but without the need to store hydrogen on board. In addition, decomposed methanol has a 22% higher heating value than that of liquid methanol and since the energy required for decomposition is extracted from the engine exhaust, the thermal efficiency of the system is increased by a corresponding amount.

The carbon monoxide produced during methanol decomposition provides a further advantage since the presence of carbon monoxide in the product gas increases the ignition energy and lowers the flame speed in the product gas, thus removing the explosive properties relative to pure hydrogen.

Finally, the extremely low lean-flammability limit of hydrogen allows ultra-lean combustion, thus increasing the thermal efficiency of the engine and reducing $NO_x$ emissions. Mixtures of hydrogen and carbon monoxide have a much higher octane rating than gasoline. It is, therefore, possible with spark ignition engines to use a higher compression ratio which will further improve engine efficiency.

It is to be realized that only preferred embodiments of the invention have been described and that numerous substitutions, alterations and modifications may be made without departing from the spirit and scope of the invention as defined in the following claims.

We claim:

1. A combustion engine system comprising:
   a combustion engine having a combustible gas inlet and an exhaust gas outlet;
   a fuel reservoir for containing liquid methanol;
   means for vaporizing said liquid fuel into methanol vapor;
   means for feeding said liquid fuel from said reservoir to said vaporizing means:
   decomposition reactor means including walls defining a flow-through decomposition zone containing a vapor-premeable body of solid, selective methanol decomposition catalyst coated on a high heat capacity support for catalytically decomposing said methanol vapor selectively into a soot free product gas consisting essentially of hydrogen and carbon monoxide at a temperature from 250° C. to 650° C.;
   means for heating said decomposition reactor to a temperature from 200° C. to 650° C.;
   means for transferring said vapor to said decomposition reactor means from said vaporizing means;
   carburetor means for mixing an oxygen containing gas with said product gas to form combustion gas consisting of product gas and oxygen;
   means for continuously transferring said combustion gas from said carburetor means to said combustion reactor during operation of the engine; and
   means connecting said exhaust gas outlet to said heating means.

2. A combustin engine system according to claim 1 wherein said decomposition zone is defined by one or more elongated tubes.

3. An apparatus according to claim 2 wherein said elongated tubes contain said decomposition catalyst.

4. A combustion engine system according to claim 3 wherein said heating means includes:
   an inlet and an outlet connected to said walls for introducing heated gas into said zone whereby said heated gas flows past the outside surfaces of said tubes to form a partially cooled gas leaving said outlet; and
   means connected to said outlet for transferring said partially cooled gas into thermal contact with vaporizing means.

5. A combustion engine system according to claim 2 wherein said body of catalyst is in the form of a high heat capacity porous element.

6. A combustion engine system according to claim 5 wherein said catalyst is supported on the surface of the pores of said element.

7. A combustion engine system according to claim 6 in which the catalyst comprises a coating on the surface of the walls of said pores.

8. A combustion engine system according to claim 5 in which the catalyst is selected from copper-zinc, copper-chromium or zinc-chromium.

9. A combustion engine system according to claim 8 in which the catalyst further includes a rare earth promoter.

10. A combustion engine system according to claim 8 in which the catalyst is copper-zinc.

11. An apparatus according to claim 2 in which the catalyst is selected from methanol synthesis or water-gas, shift-type catalysts.

12. A combustion engine system according to claim 5 in which the element is an integral, monolithic ceramic or metal cylindrical insert containing a plurality of parallel, elongated channels.

13. A combustion engine system according to claim 5 in which said element is in the form of an irregular mesh or sponge.

14. A combustion engine system according to claim 13 in which said heated gas is exhaust gas from an internal combustion engine.

15. A combustion engine system according to claim 1 wherein said heating means includes:
   an inlet and an outlet to said decomposition reactor;

means for introducing heated gas into said inlet whereby said heated gas flows through said reactor to form a partially cooled gas leaving said outlet.

16. A combustion engine system according to claim 15 wherein means connected to said outlet are provided for transferring said partially cooled gas into thermal contact with said vaporizing means.

17. A combustion engine system according to claim 1 wherein means are provided for transferring liquid fuel directly to said carburetor means.

18. A combustion engine system according to claim 17 wherein said liquid fuel is methanol.

19. A combustion engine system according to claim 1 wherein said combustion engine is a spark ignited internal combustion engine.

20. A combustion engine system according to claim 1 wherein said combustion engine is compression ignited internal combustion engine.

21. A combustion engine system according to claim 20 wherein injector means are provided for injecting methanol into said compression ignited internal combustion engine.

22. A combustion engine system according to claim 21 wherein additional means are provided for injecting diesel fuel into said compression ignited internal combustion engine.

23. A combustion engine system according to claim 1 in which the engine is a gas turbine.

24. A combustion engine system according to claim 1 further including cooling means for cooling said product gas.

25. A combustion engine system according to claim 1 in which the permeable body of catalyst includes an element of a noble metal catalyst promoted to react at lower temperature and not form soot at higher temperature.

26. A combustion engine system according to claim 25 in which the body of catalyst contains an element of a promoted noble metal catalyst and a separate spaced element of shift catalyst.

27. A combustion engine system according to claim 1 in which the catalyst is selected from a water gas shift catalyst or a methanol synthesis catalyst.

28. A combustion process comprising the steps of:
vaporizing liquid methanol to form a methanol vapor;
passing the methanol vapor through a porous body of solid, selective methanol decomposition catalyst heated to a temperature of from 200° to 650° C. to form a soot-free product gas consisting essentially of hydrogen and carbon monoxide;
mixing the hydrogen and carbon monoxide product with air to form a combustion gas;
combusting said combustion gas in an internal combustion engine; and
removing hot exhaust gas from said internal combustion engine and using said exhaust gas to vaporize said methanol liquid and heat said body of catalyst.

29. A process according to claim 28 in which the catalyst is selected from a water gas shift catalyst or a methanol synthesis catalyst.

* * * * *